UNITED STATES PATENT OFFICE.

ERNEST L. RANSOME, OF SAN FRANCISCO, CALIFORNIA.

IMPROVEMENT IN PROCESSES OF MANUFACTURING ARTIFICIAL STONE.

Specification forming part of Letters Patent No. 133,887, dated December 10, 1872; reissue No. 6,066, dated September 22, 1874; application filed June 12, 1871.

*To all whom it may concern:*

Be it known that I, ERNEST L. RANSOME, of Greenwich, county of Kent, England, at present residing in the city of San Francisco and State of California, have invented certain Improvements in Artificial Stone; and I hereby declare the following to be a full, clear, and exact description thereof.

My invention relates to improvements in the manufacture of that class of artificial stone in which the silicate of soda or potash is used as an ingredient.

Heretofore it has been usual to first prepare the silicate of either of these alkaline bases, and then incorporate it, during the process of mixing, with the other ingredients which compose the stone. When this is done the rapid setting and hardening of the mass renders the speedy manipulation of the mixture necessary in order to properly incorporate the constituents and mold or form the block or stone into the desired shape, and, if the manipulation be delayed too long, the structure of the stone is imperfect and its quality impaired.

My improvement consists in combining, with the other ingredients which compose the stone, the separate ingredients, which, when combined, will form silicate of soda or potash, so that the silicate of soda or potash may be formed in the mass, and thus protract the effect which the silicate of these alkalies has in setting and hardening the mass, and consesequently giving a greater length of time for manipulating the mixture.

Taking, for example, the artificial stone patented in England by Frederick Ransome, of England, on the 29th of April, 1871, and for which Letters Patent of the United States No. 133,888 were issued to him on the 10th day of December, 1872—in which he combines "finely-divided silica in a soluble state with a solution of silicate of soda or potash, or of a mixture of such silicates, lime, clay, or other material"—instead of making the combination as stated by the said Frederick Ransome, I mix finely-divided soluble silicas with lime, chalk, clay, sand, hydraulic cement, or other like substances, and then add a solution of caustic soda or potash, or carbonate of soda or potash, so that the union of the silica and caustic soda or potash or carbonate of soda or potash in the body of the mass will form a silicate of the soda or potash in the mixture.

I use the term "soluble silicas" in contradistinction to less soluble forms of silica, as quartz, flints, sands, &c.

By the above-described process I obviate the necessity of employing silicate of soda or potash as a separate ingredient in compounding the constituents of artificial stone.

I am aware silicate of soda is formed in the body of the stone patented by Frederick Ransome, April 29, 1871; but said Frederick Ransome employs the prepared or manufactured silica as an ingredient to start with, which by my process is rendered unnecessary.

After the stone has been thus formed I subject it to heat and moisture in order to season and indurate it.

Having thus described my invention, what I claim as new and novel is—

In the manufacture of artificial stone, the process of forming silicates of soda or potash by chemical reaction among the ingredients used in the body of the mass, substantially as set forth.

In witness whereof I hereunto set my hand and seal.

ERNEST L. RANSOME. [L. S.]

Witnesses:

DANIEL MCLAREN,
JOHN L. BOONE.